United States Patent
Pirooz

[15] 3,645,711
[45] Feb. 29, 1972

[54] METHODS OF MAKING OPAL GLASS ARTICLES

[72] Inventor: Perry P. Pirooz, Toledo, Ohio
[73] Assignee: Owens-Illinois, Inc.
[22] Filed: Jan. 19, 1970
[21] Appl. No.: 3,999

Related U.S. Application Data

[62] Division of Ser. No. 653,404, July 14, 1967, abandoned.

[52] U.S. Cl. ...................65/33, 106/29 DV, 106/54, 65/117
[51] Int. Cl. ..............................C03b 29/00, C04b 33/00
[58] Field of Search ..............106/39 DV, 54, 52; 65/33, 18, 65/117

[56] References Cited

UNITED STATES PATENTS

| | | | |
|---|---|---|---|
| 3,054,686 | 9/1962 | Hagedorn | 106/54 |
| 3,121,628 | 2/1964 | Loehrke | 65/18 |
| 3,275,492 | 9/1966 | Herbert | 106/52 X |
| 3,413,133 | 11/1968 | Stalego | 106/54 |
| 3,420,684 | 1/1969 | Hagedorn | 106/54 |

*Primary Examiner*—James E. Poer
*Assistant Examiner*—W. R. Satterfield
*Attorney*—Richard D. Heberling and E. J. Holler

[57] ABSTRACT

Methods of making thermally opalizable glass compositions suitable for use in making opal glass containers and low-expansion, heat resistant oven ware consisting essentially of $SiO_2$, $Al_2O_3$, $B_2O_3$, CaO, MgO and $Na_2O$ in specified critical amounts. Preferably, an article is formed of the above glass composition, and heat treated to provide an in situ glass-in-glass phase separation by maintaining the article at a temperature in the neighborhood of 1,050° to 1,550° F. for about one-fourth to 8 hours.

7 Claims, 2 Drawing Figures

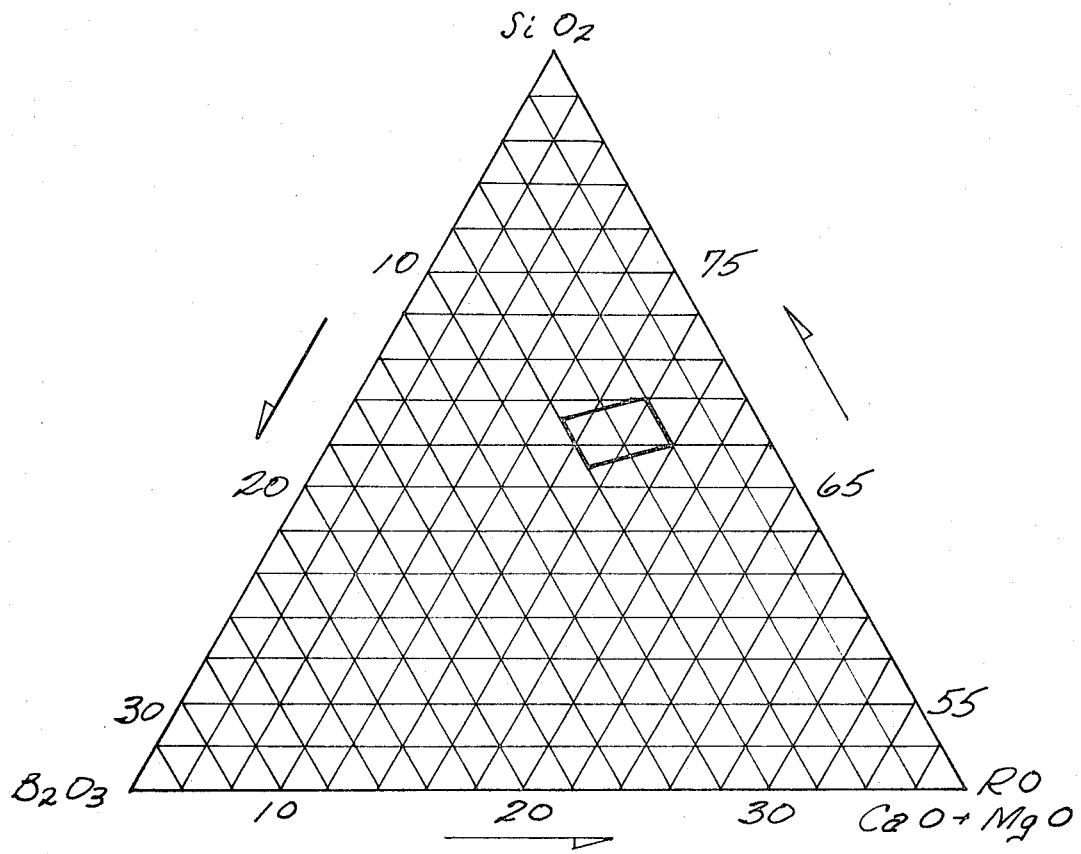

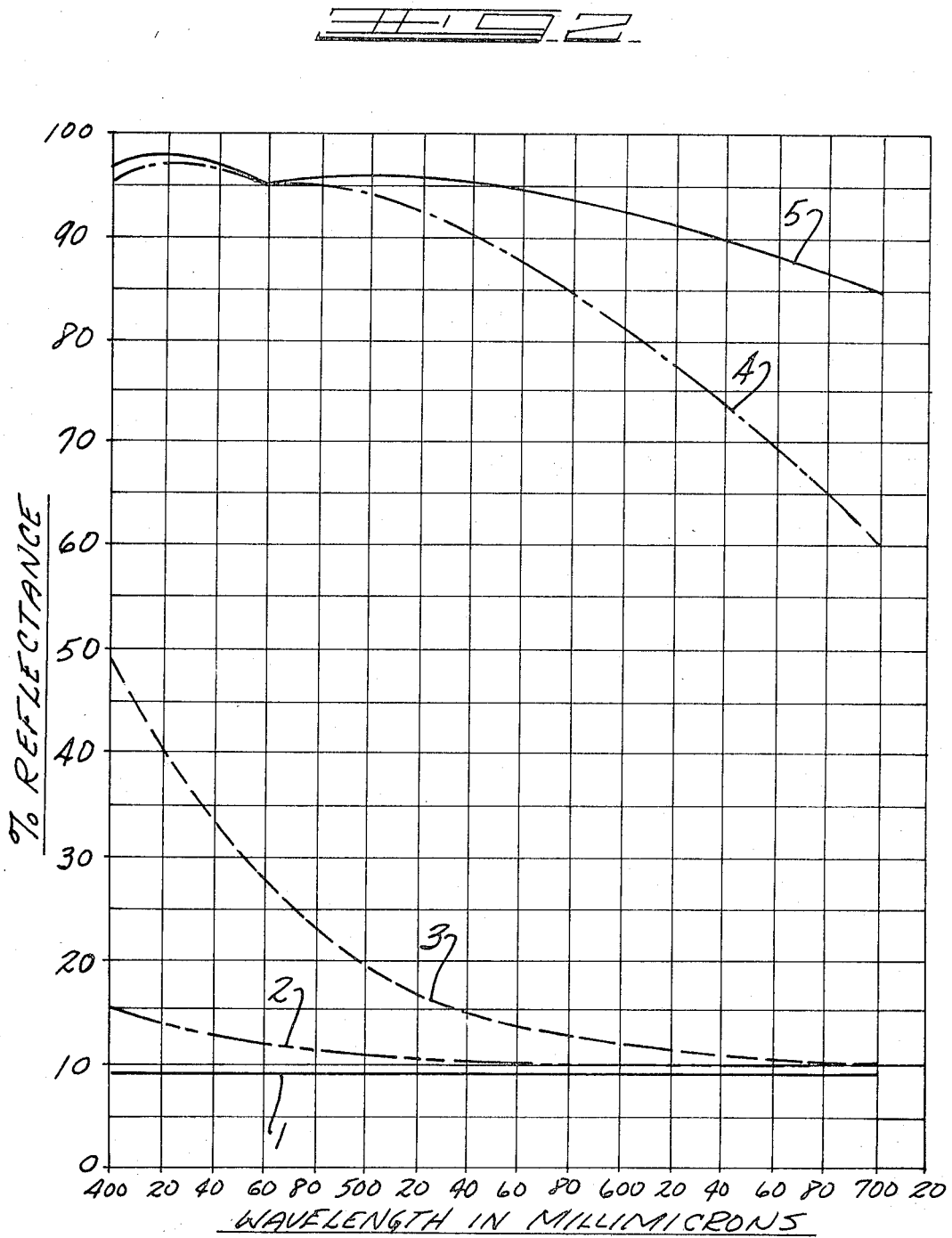

METHODS OF MAKING OPAL GLASS ARTICLES

CROSS-REFERENCE TO RELATED APPLICATION:

This application is a divisional application of copending application Ser. No. 653,404 filed July 14, 1967, now abandoned and assigned to the same assignee as the present invention.

THE INVENTION

The term opal glass as used herein denotes any glass which has a light-diffusing medium or phase therein which renders the glass essentially light diffusing and thus translucent or opaque. The term opalescent glass refers to those opal glasses which have a light-diffusing medium therein which renders the glass translucent.

Opal glasses are widely used in the fields of science, industry and commerce in the form of containers for therapeutic and cosmetic creams for deodorant containers, lighting globes, glass filters and the like.

More recently, there has been increased demand for low-cost, high-quality, heat-resisting, chemically stable, opal glass containers which can be produced at low cost in large quantities by conventional high-speed glass-forming techniques. Conventional opal glasses have not fulfilled these requirements in that in manufacturing opal glasses by the prior art methods, it is often necessary to rebuild or replace the glass-melting furnace at frequent intervals due to the corrosive nature of the opacifying agents (e.g., fluoride and phosphates) on the furnace refractories. This is expensive, and makes prolonged, continuous operation impractical. Additionally, the batch costs for such opal glasses are often quite high when compared to conventional soda-lime-silica glass batch costs. Another disadvantage associated with opal glass manufacturing is that of high fuel consumption in gas fired furnaces during the melting and refining operation. Fuel costs are high since the molten glass itself is opal, and radiant heat energy tends to be reflected rather than absorbed by the molten glass.

Another disadvantage of known opal glasses is that the degree of opacity is often difficult to control and nonuniformity in the finished article is frequently a problem. This nonuniformity is caused by improper mixing of the opacifying agent in the batch which results in localized uncontrolled development of the opalizing species.

Accordingly, it is an object of this invention to provide novel opal glass compositions which are suitable for forming opal glass containers by conventional high-speed glass melting and forming techniques.

Another object of the present invention is to provide low-cost thermal shock resisting, chemically stable opal glass containers.

A further object is to provide thermally opalizable glass compositions which are transparent during the melting and forming processes but yet readily opalized upon specialized heat treatments, which treatments can be accomplished during an annealing heat cycle of the formed article.

A further object is to provide low expansion, inexpensive opal glass articles.

And yet another object is to provide a method for forming opal glass containers which method can be readily incorporated into conventional glass container manufacturing processes.

The above and other objects, features and advantages of the present invention will become more apparent from the following description and drawings wherein:

FIG. 1 is a ternary diagram illustrating a glass compositional field suitable for the purposes of the present invention.

FIG. 2 is a graph illustrating the reflectance of certain exemplary opal glasses as a function of wavelength.

Commonly assigned, copending application of E. C. Hagedorn, Ser. No. 653,357 filed July 14, 1967, discloses a wide compositional field of thermally opalizable glasses. The present invention provides commercially desirable glass compositions that can be opalized during a modified annealing cycle utilizing conventional processing equipment.

The present invention also provides desirable forming properties such as viscosity-temperature relationship, liquidus temperature, thermal expansion, in addition to having low batch costs and good chemical durability.

The present glasses consist essentially of the following approximate percentages by weight:

| | |
|---|---|
| $SiO_2$ | 66 – 69 |
| $Al_2O_3$ | about 6 |
| $B_2O_3$ | 4 – 8 |
| RO (CaO + MgO) | 13 – 18 |
| $Na_2O$ | about 5 | wherein CaO weight %/MgO weight % = about 1.4
These glasses have the properties:

| | |
|---|---|
| Temperature at log 2 viscosity | <2850° F. |
| Temperature at log 3 viscosity | <2400° F. |
| Temperature at log 7.65 viscosity | <1700° F. |
| Temperature at liquidus | 2200° F. |
| Temperature at log 3 viscosity (° F.) minus Temperature at the liquidus (° F.) | <200° F. |
| Coefficient of thermal expansion | <60 × $10^{-7}$/° C. (0–300° C.) |

Highly preferred compositions within the above range are graphically illustrated in FIG. 1. Dolomite lime was used as the source of CaO and MgO, so weight % CaO/weight % MgO = about 1.4. The preferred glasses are those glasses bounded by the parallelogram in the central portion of the ternary diagram. The limits of this parallelogram were determined by evaluating the glass forming and annealing properties in view of the opalization heat treatment required. Glasses within this preferred range of composition have excellent forming properties and will undergo thermal opalization in very short time periods at relatively low temperatures. It has been found that articles formed from these compositions can be opalized during a modified annealing cycle. In these glass compositions, $B_2O_3$ is the primary opalizing agent and the tendency for the glasses to opalize increases with increasing $B_2O_3$.

Soda ($Na_2O$) serves as a stabilizing agent and prevents rapid, uncontrolled opalization. Soda also influences the glass viscosity as well as serving as a fluxing agent.

Alumina ($Al_2O_3$) also serves as a stabilizing agent in that the $Al_2O_3$ establishes the viscosity and the viscosity controls the rate of opalization.

The alkaline earth oxides, CaO and MgO are present in the dolomitic ratio and tend to influence the glass viscosity as well as adding chemical stability to the opalized glass.

The exact mechanism by which the phase separation that causes the opalization phenomenon occurs is not presently known. It is strongly suspected however, that the opalization process involves a physical-chemical process known as "spinodal decomposition." The factors governing spinodal decomposition are not completely understood, but it is known that composition and time and temperature of the heat treatment are the controlling factors.

Spinodal decomposition can be described as the separation of a mutual solution containing two or more components, into at least two separate phases which phases are within the unstable spinodal region of the system phase diagram. This phase separation is described as "spinodal" because this term mathematically describes describes that area enclosed by a graph of the thermodynamic property of free energy as a function of composition in the region in which the phase separation takes place.

When the heat treatment has been properly carried out, the glass will be essentially separated into two immiscible, but continuous glassy phases. (Ordinarily there will be no crystalline phases present.) Because of this phase separation, the glass will be opalescent in appearance. One of these glassy phases is observed to contain alumina, alkaline earth oxides, soda and boron oxides. This glassy phase is relatively chemically stable and is quite resistant to acids and alkalis. The other glassy phase is primarily silica. This siliceous phase contributes mechanical strength and thermal stability to the resulting opal glass. It is observed that the phases are formed in proportion to the ratio of their respective constituents in the original glass.

The time and temperature for the opalization heat treatment of these glasses closely coincides with the annealing heat cycle for conventional lightweight glass articles. That is, these glasses can be opalized by heat treating at temperatures from about 1,050° F. to about 1,550° F. for time periods ranging from 15 minutes to about 8 hours. Preferably, the opalization heat treatment is carried out at temperatures of about 1,400° F. to about 1,500° F. for a time period of about 1 hour in the interest of economic practicality.

The following tables are presented to numerically illustrate glass compositions within this preferred compositional field, as a function of the $B_2O_3$ content.

| $B_2O_3$ content is about 4% | |
| --- | --- |
| Component | % by weight |
| $Na_2O$ | about 5% |
| $Al_2O_3$ | about 6% |
| $SiO_2$ | 67 – 69% |
| RO (CaO + MgO) | 16 – 18% |

| $B_2O_3$ content is about 6% | |
| --- | --- |
| Component | % by weight |
| $Na_2O$ | about 5 |
| $Al_2O_3$ | about 6 |
| $SiO_2$ | 66.5 – 68.5 |
| RO (CaO + MgO) | 14.5 – 16.5 |

| $B_2O_3$ content is about 8% | |
| --- | --- |
| Component | % by weight |
| $Na_2O$ | about 5 |
| $Al_2O_3$ | about 6 |
| $SiO_2$ | 66 – 68 |
| RO (CaO + MgO) | 13 – 15 |

These glasses require no special melting and refining conditions and can be melted in continuous gas fired furnaces at temperatures of 2,600° to 2,900° F. Conventional batch materials can be used as will be evident from the following examples.

EXAMPLE 1

The batch materials:

| Powdered Flint | 3967.94 |
| --- | --- |
| Raw Dolomite Lime | 2069.30 |
| Soda Ash | 517.24 |
| Boric anhydride | 314.47 |
| Alumina | 362.17 | were melted in a platinum crucible at glass temperatures of 2,900° F. in an electric furnace with mechanical stirring. The melting time was about 24 hours to assure homogeneity.

Cane was drawn from the molten glass to form sample rods and the rods were cooled in ambient air. Sample rods were cut from the cane. The rods were clear and transparent in appearance and had the following composition:

| Component | % by weight |
| --- | --- |
| $SiO_2$ | 66.0 |
| $Al_2O_3$ | 6.0 |
| CaO | 10.0 |
| MgO | 7.5 |
| $Na_2O$ | 5.0 |
| $B_2O_3$ | 5.0 |

Several of these rods were heat treated at 1,470° F. for 15 minutes. At the end of this period the rods were slightly opalescent (faintly turbid) in appearance. The coefficient of thermal expansion over the range of (0° to 300° C.) was measured by standard techniques and was observed to be $59.6 \times 10^{8/7}$.

Other rod samples of this composition were heat treated at 1,470° F. for 16 hours. At the end of this period, the rods were uniformly opal in appearance and the coefficient of thermal expansion was observed to be $60.4 \times 10^{-7}$/°C. (0° to 300° C.). This is an increase of about 1.3 percent in the coefficient of thermal expansion.

EXAMPLE 2

Clear, transparent, sample plates about one-half inch thickness, were formed from the composition of Example 1 by casting the molten glass into a shallow refractory tray in open air. The plates were subjected to various heat treatments to effect opalescence in order that reflectance measurements could be obtained.

The heat treatment and the appearance of the sample plates are set forth below. The optical reflectance of radiant energy in the visible wavelength range was determined by standard photometric techniques. This data is presented graphically in FIG. 2.

Sample Plate 1

Heat treatment — none (control)
Appearance—clear and transparent

Sample Plate 2

Heat treatment—one-half hour at 1,470° F.
Appearance—slight opalescence

Sample Plate 3

Heat treatment—1 hour at 1,470° F.
Appearance—slight opalescence

Sample Plate 4

Heat treatment—8 hours at 1,470° F.
Appearance—almost opaque opal

Sample Plate 5

Heat treatment—2 hours at 1,520° F.
Appearance—opaque opal

The above sample plates were ground and polished until the surface was smooth and the optical reflection characteristics were determined by standard techniques utilizing a General Electric "Hardy" model spectrophotometer against a black background. The results are shown in FIG. 2. These curves demonstrate how the time and temperature of the heat treatment can be varied to achieve the desired optical properties in the glasses of invention.

EXAMPLE 3

Batch materials were melted and rods were formed by the method of Example 1. The glass had the following composition and properties:

| $SiO_2$ | 67% |
| --- | --- |
| $Al_2O_3$ | 6 |
| CaO | 9.3 |
| MgO | 6.7 |
| $Na_2O$ | 5 |
| $B_2O_3$ | 6 |
| Temperature at log 2 viscosity | 2780° F. |
| Temperature at log 3 viscosity | 23525° F. |
| Temperature at log 7.65 viscosity | 1555° F. |
| Liquidus temperature | 2150° F. |
| Temperature at log 3 viscosity minus Temperature at liquidus | 175° F. |
| Coefficient of thermal expansion | $58 \times 10^{-7}$/°C. (0–300° C.) |

Annealing tests were performed on these rods and it was determined that the rods were slightly opalescent after being annealed at 1,380° F. for 1 hour. Further tests were performed on rods of these compositions and it was found that the rods became a dense opaque opal after 1 hour at 1,510° F. This data indicates that the annealing and opalization heat treatments can be combined.

From the foregoing, it will be apparent that a system of commercially desirable thermally opalizable glasses has been provided.

Having thus described the invention, what is claimed is:

1. In a method for making a substantially fluorine-free and phosphorus-free opal glass article from a thermally opalizable glass composition in which the method includes a forming step for forming the article and an annealing cycle for annealing the formed article, the method comprising the steps of:
   1. forming a glass article from a glass composition consisting essentially of the following ingredients in approximate percentages by weight:

| Ingredients | Percent |
   |---|---|
   | $SiO_2$ | 66–69 |
   | $Al_2O_3$ | 6 |
   | $B_2O_3$ | 4–8 |
   | CaO+MgO | 13–18 |
   | $Na_2O$ | 5 | wherein CaO weight percent/MgO weight percent = about 1.4 said glass composition having the properties

| | |
   |---|---|
   | Temperature at log 3 viscosity | <2400° F. |
   | Temperature at liquidus | <2200° F. |
   | Temperature at log 3 viscosity (° F.) minus Temperature at liquidus (° F.) | <200° F. |
   | of thermal expansion | $60 \times 10^{-7}/°C.$ (0–300° C.), | and
   2. thermally effecting concurrently with the annealing cycle an in situ phase separation by maintaining the glass article at temperatures ranging from about 1,050° F. to about 1,550° F. for time periods ranging from about 15 minutes to about 8 hours.

2. The method of claim 6, wherein the opalization heat treatment temperature is about 1,510° F. and the time period is about 1 hour.

3. The method of claim 1 wherein the opalization heat treatment is carried out at temperatures of about 1,400° F. to about 1,500° F. for the time period of about 1 hour.

4. An opal glass product prepared by the method of claim 1.

5. A method as defined in claim 1 in which the glass has the following approximate composition:

| | |
   |---|---|
   | $SiO_2$ | 67% |
   | $Al_2O_3$ | 6% |
   | CaO | 9.3% |
   | MgO | 6.7% |
   | $Na_2O$ | 5% |
   | $B_2O_3$ | 6% |

6. A method as defined in claim 1 in which the glass has the following approximate composition:

| | |
   |---|---|
   | $SiO_2$ | 66% |
   | $Al_2O_3$ | 6% |
   | CaO | 10% |
   | MgO | 7.5% |
   | $Na_2O$ | 5% |
   | $B_2O_3$ | 5% |

7. A method as defined in claim 1 in which the glass has the following approximate composition:

| | Percent |
   |---|---|
   | $SiO_2$ | 66–68 |
   | $Al_2O_3$ | 6 |
   | $B_2O_3$ | 8 |
   | CaO+MgO | 13–15 |
   | $Na_2O$ | 5 |

* * * * *